(12) United States Patent
Arata et al.

(10) Patent No.: US 8,434,828 B2
(45) Date of Patent: May 7, 2013

(54) VEHICULAR SEAT ASSEMBLY

(75) Inventors: Yuji Arata, Wako (JP); Kazuyuki Kaneko, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 419 days.

(21) Appl. No.: 12/797,929

(22) Filed: Jun. 10, 2010

(65) Prior Publication Data

US 2010/0314924 A1      Dec. 16, 2010

(30) Foreign Application Priority Data

Jun. 11, 2009   (JP) .................................. 2009-140584

(51) Int. Cl.
*B60R 22/26*   (2006.01)

(52) U.S. Cl.
USPC .......................................... 297/481; 297/353

(58) Field of Classification Search ............... 297/250.1, 297/253, 481
See application file for complete search history.

(56) References Cited

U.S. PATENT DOCUMENTS

| 2,964,100 | A | * | 12/1960 | McCall | 297/474 |
| 4,810,037 | A | * | 3/1989 | Takagi | 297/481 |
| 5,044,695 | A | * | 9/1991 | Tsuchiya | 297/481 |
| 5,139,311 | A | * | 8/1992 | Imai et al. | 297/481 |
| 5,979,982 | A | * | 11/1999 | Nakagawa | 297/250.1 |
| 6,193,310 | B1 | * | 2/2001 | Batalaris et al. | 297/253 |
| 6,322,141 | B1 | * | 11/2001 | Dutkievic et al. | 297/218.1 |
| 6,478,376 | B2 | * | 11/2002 | Hayashi et al. | 297/250.1 |
| 7,699,396 | B2 | * | 4/2010 | Ghisoni et al. | 297/253 |
| 7,862,125 | B2 | * | 1/2011 | Weinstein et al. | 297/481 |
| 2004/0084940 | A1 | * | 5/2004 | Morita | 297/253 |
| 2004/0207245 | A1 | * | 10/2004 | Baylis | 297/481 |

FOREIGN PATENT DOCUMENTS

| JP | 53-121637 | 9/1978 |
| JP | 08-011612 | 1/1996 |
| JP | 2001-199270 | 7/2001 |
| JP | 2001-277920 | 10/2001 |
| JP | 2002-336091 | 11/2002 |

* cited by examiner

*Primary Examiner* — Peter Brown (74) *Attorney, Agent, or Firm* — Rankin, Hill & Clark LLP (57) ABSTRACT

A vehicle seat assembly includes a seat cushion having a connector insertion hole for receiving therein a connector of a child seat for attachment of the child seat to the seat assembly, and a buckle insertion slit for allowing a buckle to be pulled out onto the seat cushion. The buckle insertion slit and the connector insertion hole are formed contiguously or otherwise integrally with each other.

4 Claims, 6 Drawing Sheets

VEHICULAR SEAT ASSEMBLY

FIELD OF THE INVENTION

The present invention relates to a vehicular seat assembly configured for use with a seat belt assembly and a child seat.

BACKGROUND OF THE INVENTION

Vehicular seats designed to accept the attachment of a child seat are known as shown, for example, in Japanese Patent Application Laid-Open Publication (JP-A1) No. 2001-199270. The disclosed vehicular seat includes a seat frame having a striker for securing a child seat to the seat frame. The striker is integrally covered by an upwardly swelling part of a pad material arranged at a rear end portion of a seat cushion, and a facing material covering the pad material. The seat cushion has slits formed respectively in the swelling part of the pad material and the facing material for allowing insertion of a lock member of the child seat. When the child seat is to be attached to the vehicular seat, the locking member of the child seat is inserted from the slits in a manner such that a locking claw of the locking member is locked on the striker.

The prior arrangement shown in JP 2001-199270 A1, however, can cause a problem when it is employed in a vehicular bench seat of the type having buckle insertion holes formed in a seat cushion for the passage therethrough of the respective buckles of seat belt assemblies. Since the buckle insertion holes are formed separately and independently from the arrangement of the child-seat's locking-member insertion slits, the seat cushion has an increased number of hollow portions or openings, which will lower the strength of the seat cushion, deteriorate the comfort of the vehicular bench seat, and allow interference between the locking member of the child seat and one of the buckles of the seat belt assemblies.

SUMMARY OF THE INVENTION

It is accordingly an object of the present invention to provide a vehicular seat assembly having a seat cushion which is capable of retaining a desired mechanical strength, can provide a high level of comfort to a vehicle occupant, and is able to prevent interference between the locking member of the child seat and the buckle of the seat belt assembly.

According to the present invention, there is provided a vehicular seat assembly configured for use with a seat belt assembly having a buckle anchored at a position below the seat assembly, and a child seat having a connector for attachment to the seat assembly. The seat assembly comprises a seat cushion including a cushion pad, the cushion pad having a connector insertion hole formed therein for receiving the connector of the child seat, and a slit formed in the cushion pad for allowing the buckle to be pulled out onto the seat cushion. The slit is formed continuously with the connector insertion hole.

With this arrangement, since the slit is continuous with the insertion hole, the cushion pad has a reduced number of openings (and a reduced area of openings) as compared to the seat cushion of the prior seat assembly in which the slit and the insertion hole are formed separately and independently from one another. With this reduced area of openings, the cushion pad can retain a desired mechanical strength. Furthermore, by virtue of the continuous or integral structure of the connector insertion hole and the slit, it is possible to centralize the hollow portions or openings in the cushion pad. With this centralized arrangement of the hollow portions, the cushion pad can provide a high level of comfort to an occupant of the vehicular seat assembly.

In one preferred form of the invention, the cushion pad has an upwardly swelling part formed at a rear end portion thereof, the connector insertion hole is formed in the upwardly swelling part, and the slit has a longitudinal portion formed in a body of the cushion pad and disposed forwardly of the upwardly swelling portion of the cushion pad. The longitudinal portion of the slit is configured to accommodate the buckle when the connector of the child seat is inserted into the connector insertion hole of the cushion pad in order to attach the child seat to the seat assembly. By thus accommodating the buckle, it is possible to prevent interference between the buckle and the connector of the child seat which may otherwise be caused when the child seat is attached to the seat assembly.

Preferably, the seat cushion further includes a facing material covering the cushion pad, the facing material having a linear slit formed therein and extending in register with both of the connector insertion hole and the slit of the cushion pad. The linear slit provides a marking for facilitating smooth and reliable insertion of the connector into the connector insertion hole.

Desirably, the slit in the cushion pad is formed to extend diametrically across the connector insertion hole, and the linear slit of the facing material extends in superposed relation to the slit of the cushion pad. This arrangement provides an improved appearance of the seat assembly.

BRIEF DESCRIPTION OF THE DRAWINGS

One preferred structural embodiment of the present invention will be described in detail below, by way of example only, with reference to the accompanying sheets of drawings, in which.

DETAILED DESCRIPTION OF THE PREFERRED EMBODIMENT

Figure 1:
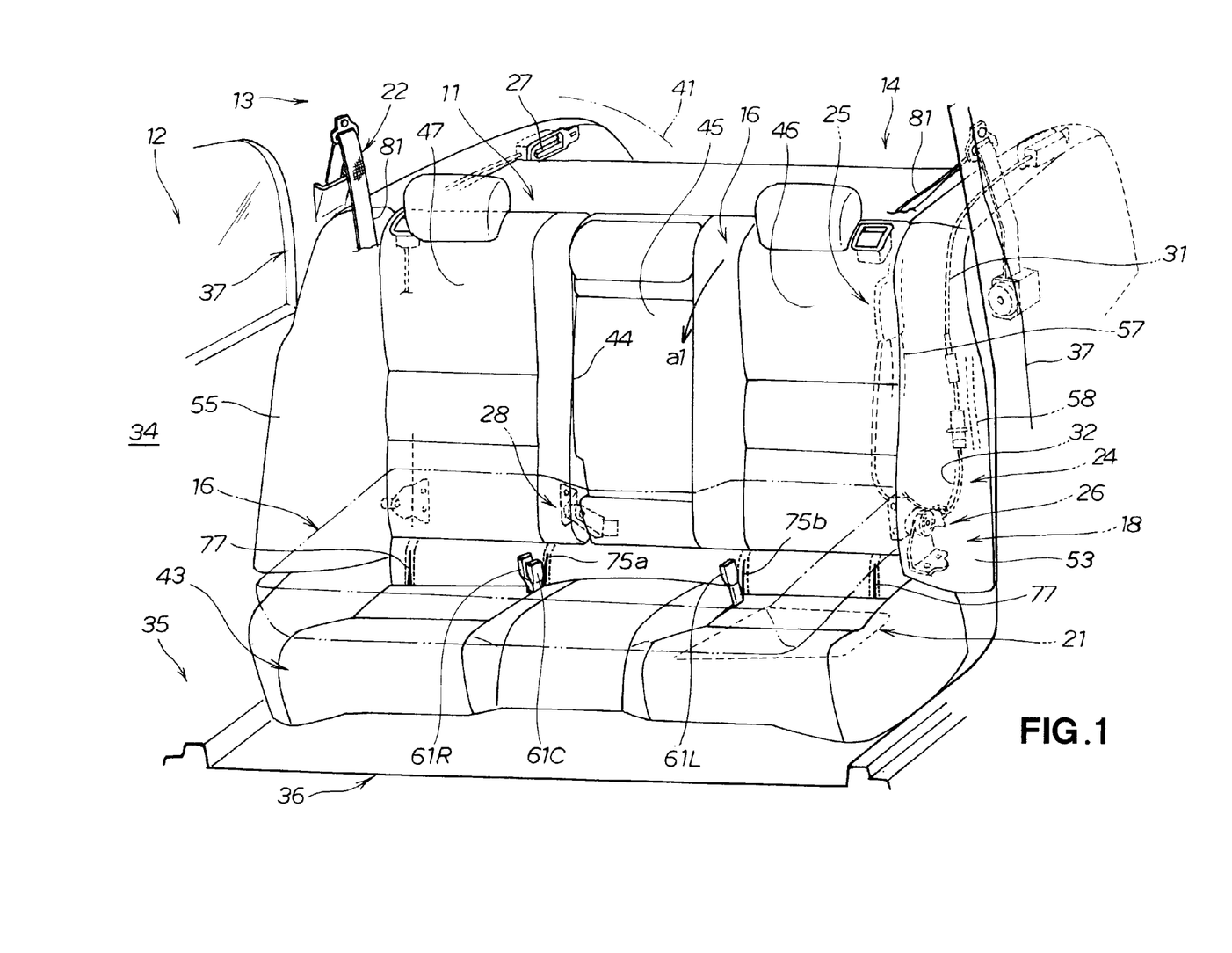
FIG. 1 is a perspective view of a vehicular seat assembly according to an embodiment of the present invention.

Referring now to the drawings and FIG. 1 in particular, there is shown a vehicular seat assembly 11 embodying the present invention. The vehicular seat assembly 11 is a split, folding rear seat assembly for a vehicle 12 that is disposed adjacent to a luggage compartment 14 in a rear part 13 of the vehicle 12 and allows three passengers or occupants to sit side by side on the seat assembly 11. The seat assembly 11 has a seat back 16 that is foldable in a forward direction as indicated by the arrow "a1" so as to assume a folded position indicated by phantom lines shown in FIG. 1.

The seat assembly 11 is equipped with a seat back fold-forward device 18 for supporting the seat back 16 in a forwardly foldable state, a seat heater 21, and a rear-seat seat belt assembly 22.

The seat back fold-forward device 18 generally comprises a remote handling device 24, a lock device 25 incorporated in the remote handling device 24, a tilting mechanism 26, an operation lever 27 incorporated in the remote handling device 24, and a seat back attachment structure 28. With this arrangement, when the operation lever 27 is manually operated from the luggage compartment side so as to unlock the lock device 25, the seat back 16 is folded forwardly by the tilting mechanism 26, as indicated by the arrow "a1" shown in FIG. 1. In FIG. 1, reference numeral 31 denotes a wire cable of the remote handling device 24, and reference numeral 32 denotes an electric cable of the seat heater 21.

The vehicle 12 in the illustrated embodiment is a six-seater hatchback vehicle having no partition wall between a passenger compartment 34 and the luggage compartment 14. The hatchback vehicle 12 has a body 35 including an underbody 36 that forms a floor of the vehicle extending longitudinally and continuously through the passenger compartment 34 and the luggage compartment 14, a rear body 37, a tailgate 41 mounted to the rear body 37 and forming a door to the luggage compartment 14. The seat assembly 11 is secured to the underbody 36.

The seat assembly (split, folding rear seat assembly) 11 includes a seat cushion 43 secured to the underbody 36, and the seat back 16 forwardly foldably mounted via the seat back fold-forward device 18 to the underbody 36. In the illustrated embodiment, the seat assembly 11 is a 6:4 split, folding rear seat assembly in which the seat back 16 has two seat back portions that can be independently folded either separately or simultaneously in the forward direction by the action of the seat back fold-forward device 18. The first seat back portion of the seat back 16 includes a central seat section 45 and a left seat section 46, and the second seat back portion of the seat back 16 includes a right seat section 47.

The seat assembly 11 also includes a left side bolster 53 disposed continuously with a left end of the seat back 16, and a right side bolster 55 disposed continuously with a right end of the seat back 16. The left side bolster 53 is non-foldable and firmly secured to a left part of the rear body 37, and the right side bolster 55 is non-foldable and firmly secured to a right part of the rear body 37. The bolsters 53 and 55 cover wiring harnesses 58 supported on the vehicle body 36 (one of the wiring harnesses covered by the left side bolster 53 being shown in FIG. 1). The seat back 16 has a seat back frame 57.

Figure 2:
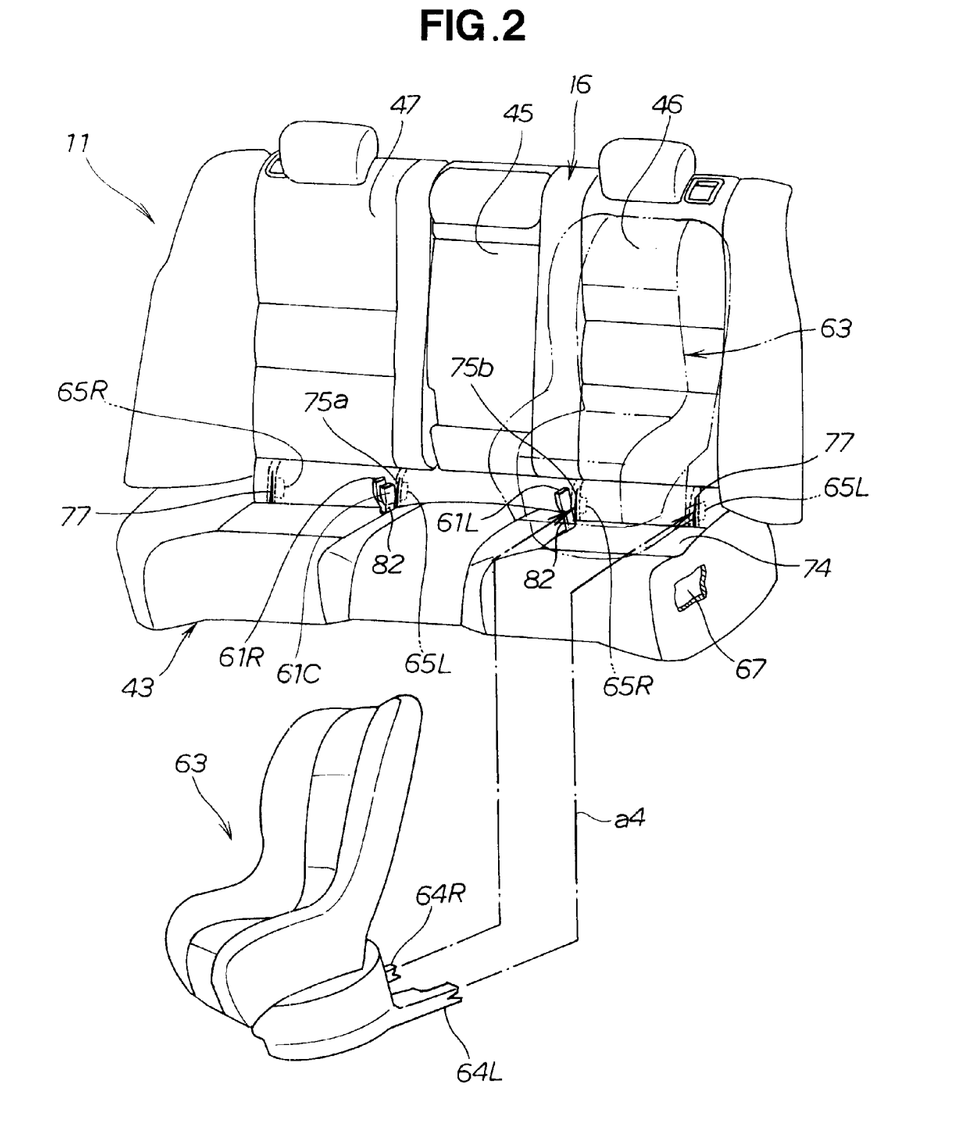
FIG. 2 is a view similar to FIG. 1, but illustrative of the manner in which a child seat is attached to the vehicular seat assembly.
Figure 3:
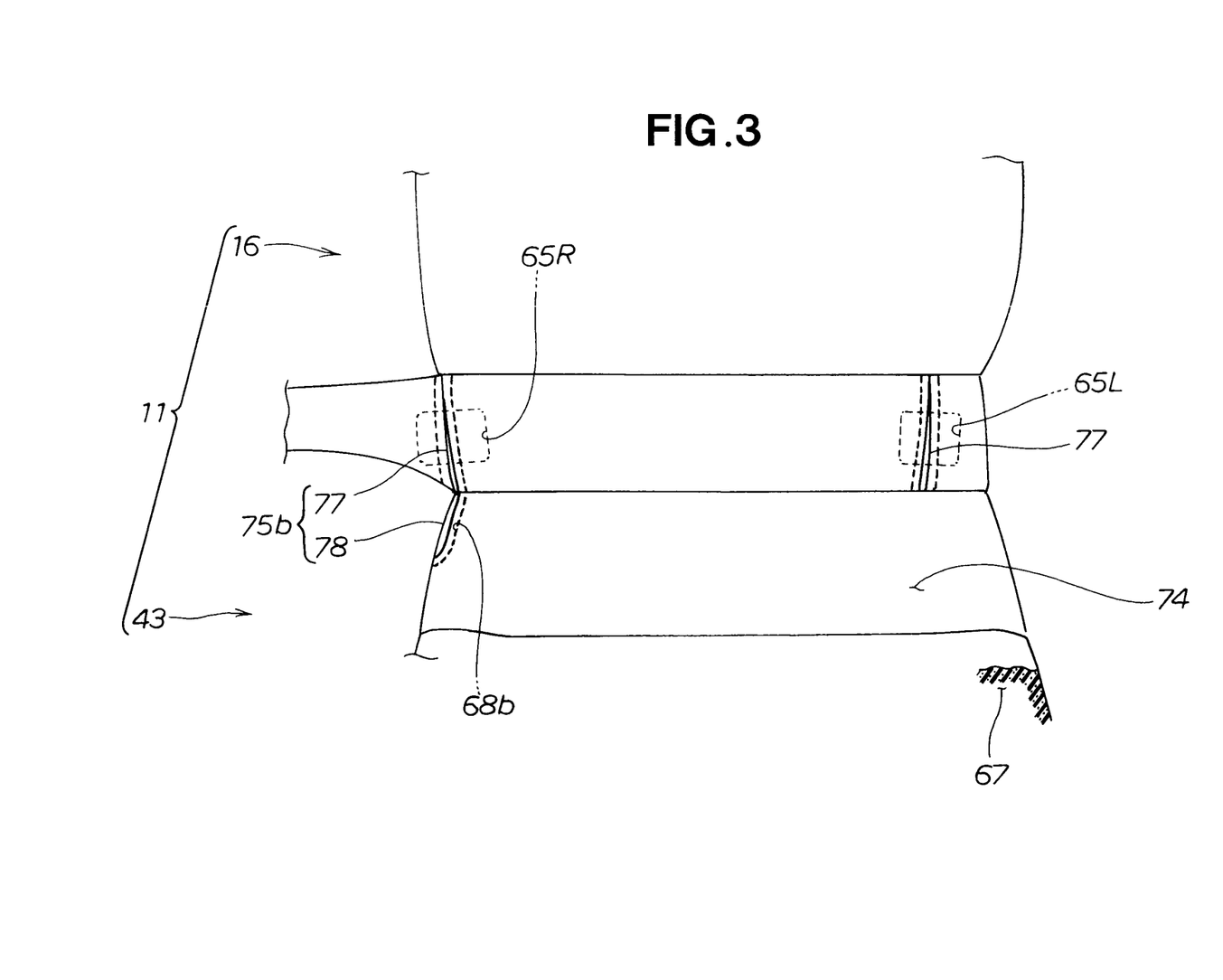
FIG. 3 is an enlarged front elevational view of a portion of the vehicular seat assembly including connector insertion holes provided for attachment of the child seat and slits provided for allowing buckles of a seat belt assembly to be pulled out in a forward direction of the vehicular seat assembly.
Figure 4:
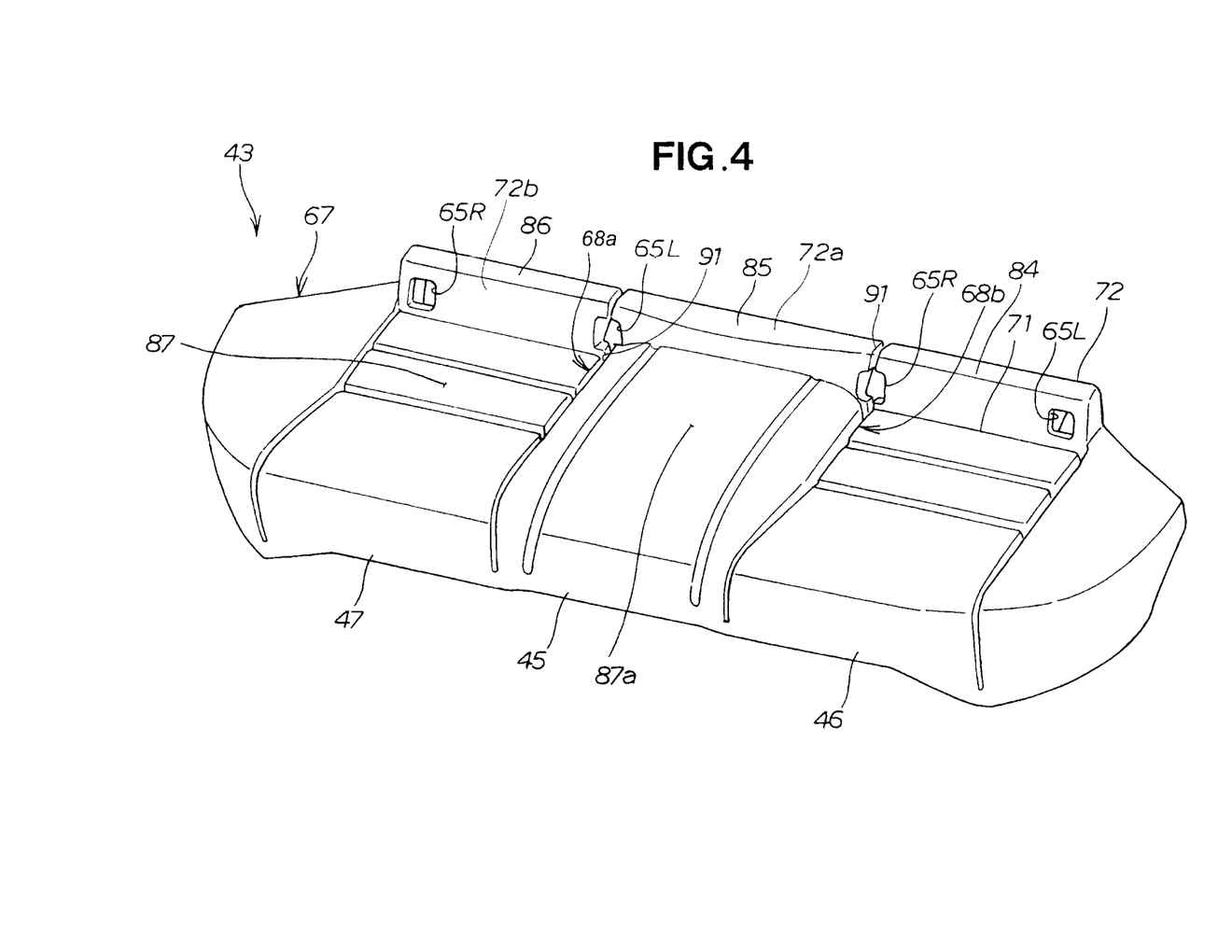
FIG. 4 is a perspective view of a cushion pad used in a seat cushion of the vehicular seat assembly.
Figure 5:
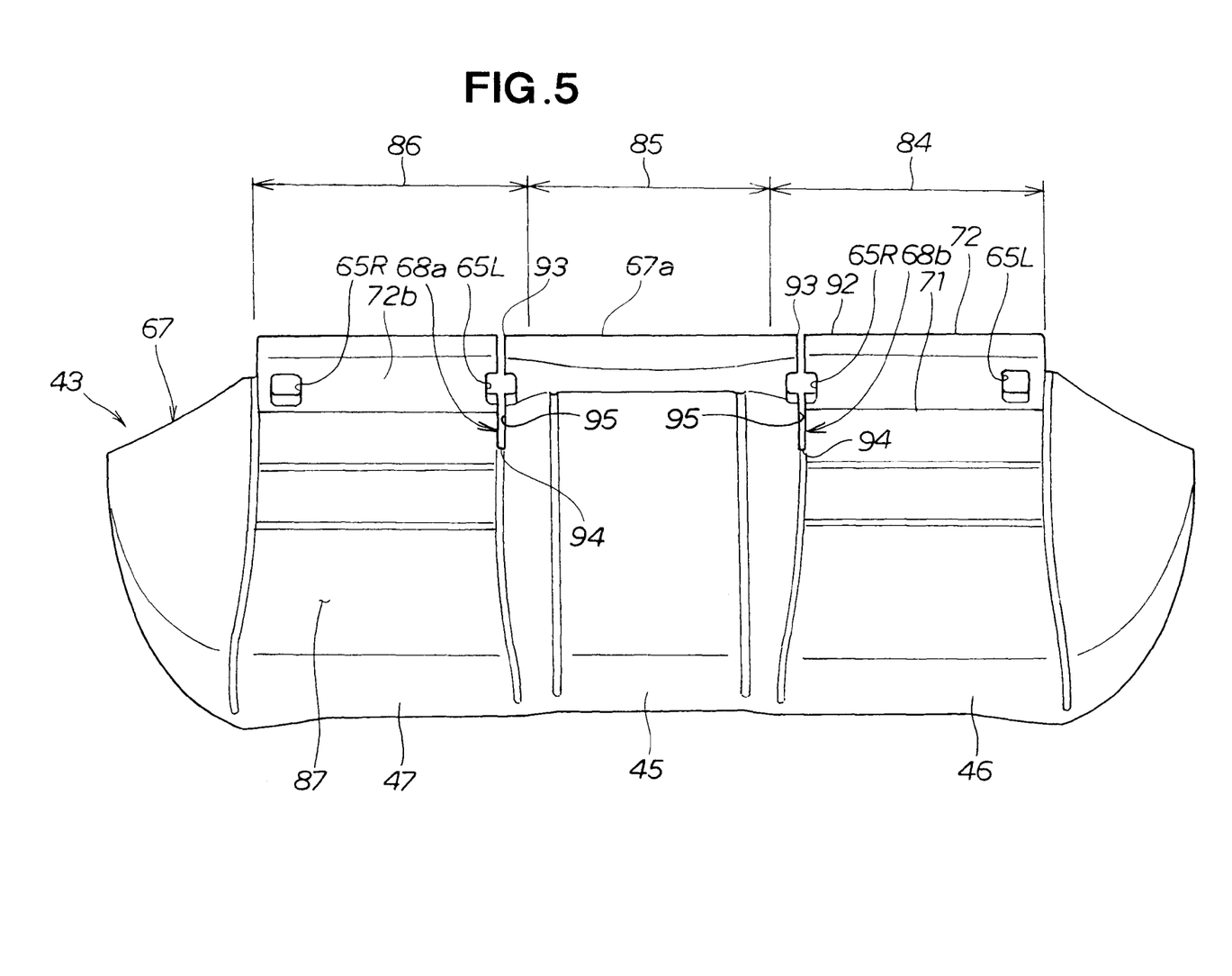
FIG. 5 is a plan view of the cushion pad shown in FIG. 4.
Figure 6:
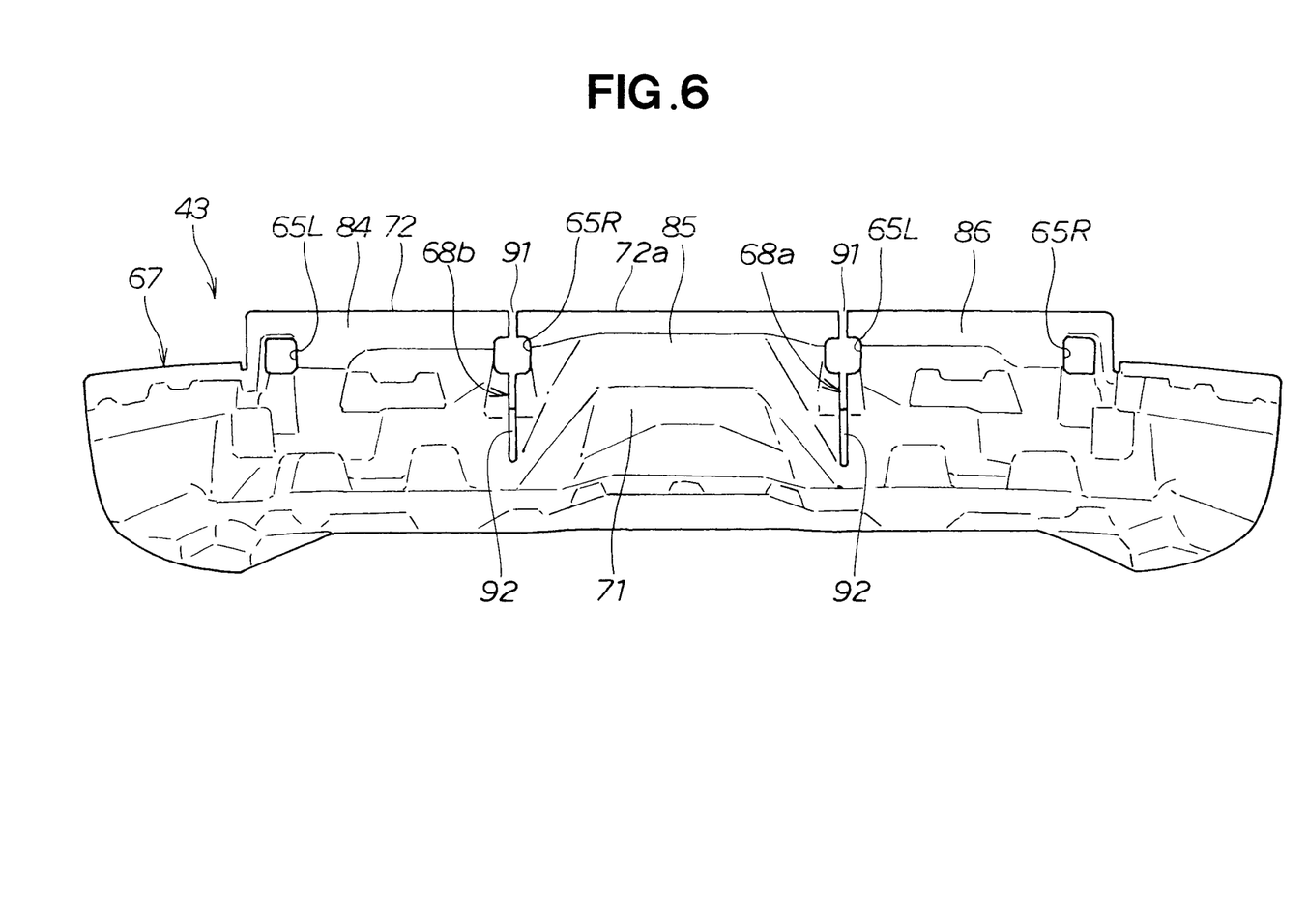
FIG. 6 is a rear view of the cushion pad shown in FIG. 4.

The seat assembly 11 embodying the invention will be described in further detail with reference to FIGS. 2 through 6. As shown in FIG. 2, buckles 61R, 61C and 61L of respective seat belt units of the seat belt assembly 22 (FIG. 1) are arranged at predetermined positions on the seat cushion 43 of the seat assembly 11 for restraining separately and independently three passengers or occupants sitting side by side on the seat cushion 43. The buckles 61R, 61C, 61L are anchored to the underbody 36 (FIG. 1) at respective positions below the seat cushion 43. The seat cushion 43 has two pairs of right and left connector insertion holes 65R and 65L formed therein for receiving a pair of right and left connectors 64R and 64L of a child seat 63 when the child seat 63 is to be attached to the seat assembly 11. More particularly, as shown in FIGS. 4-6, the connector insertion holes 65R, 65L are formed in a cushion pad 67 of the seat cushion 43, and two slits 68a and 68b are formed in the cushion pad 67 so that the buckles 61R, 61C, 61L anchored at the positions below the seat cushion 43 can be pulled out onto the seat cushion 43 through the slits 68a, 68b. The slit 68a is provided for both of the right and central buckles 61R and 61C, and the slit 68b is provided for only the left buckle 61L. The slit 68a is formed continuously or otherwise integrally with the left connector insertion hole 65L of one of the two pairs of the connector insertion holes 65R, 65L, and the slit 68b is formed continuously or otherwise integrally with the right connector insertion hole 65R of the other pair of connector insertion holes 65R, 65L.

The cushion pad 67 has a rear end portion 71 including an upwardly swelling part 72, and the connector insertion holes 65R, 65L are formed in and extend horizontally through the upwardly swelling part 72 of the cushion pad 67. The slits 68a, 68b are formed in the cushion pad 67 in a manner such that they extend vertically through the height of the upwardly swelling part 72 diametrically across the associated connector insertion holes 65L, 65R and further extend both in a vertical downward direction beyond a lower end of the upwardly swelling part 72 and in a forward direction beyond a front end of the upwardly swelling part 72 of the cushion pad 67.

Referring back to FIGS. 2 and 3, the seat cushion 43 also has a facing material 74 which covers the cushion pad 67. The facing material 74 has two linear slits 75a, 75b formed therein to extend in superposed relation to the slits 68a, 68b of the cushion pad 67. Each of the linear slits 75a, 75b has a first section (connector insertion slit) 77 formed in a part of the facing material 74 lying over a corresponding one of the connector insertion holes 65L, 65R, and a second section (buckle insertion slit) 78 formed in a part of the facing material 74 lying over a corresponding one of the slits 68a, 68b. Thus, the linear slits 75a, 75b are formed to extend in register with both of the connector insertion holes 65L, 65R and the slits 68a, 68b. The connector insertion slit 77 and the buckle insertion slit 78 are formed contiguously with each other. Two other connector insertion slits 77 are also formed in the facing material 74 at positions corresponding to the respective positions of the connector insertion holes 65R, 65L that are located adjacent to right and left ends of the seat cushion 43 and devoid of the slits 68a, 68b.

As shown in FIG. 2, the child seat 63 has a pair of right and left connectors 64R and 64L projecting rearwards from a rear end portion of a base of the child seat 63. When the child seat 63 is attached, for example, to the left seat section 46 of the vehicular seat assembly 11, the connectors 64R, 64L are inserted from the connector insertion slits 77 of the covering material 74 into the connector insertion holes 65R, 65L of the cushion pad 67 so that locking pawls (not designated) provided on distal ends of the connectors 64R, 64L are locked on a pair of right and left strikers (not shown) provided on the underbody 36. The structure of the child seat 63 should by no means be limited to the one shown in the illustrated embodiment.

Each of the seat belt units of the seat belt assembly 22 has a structure known per se, which includes, as shown in FIG. 1, a belt body or webbing 81 normally retracted on a retractor (not designated) mounted to the vehicle body 35, and the buckle 61R, 61C, 61L for releasably locking a tongue plate of the webbing 81. The buckle 61R, 61C, 61L has a buckle strap 82 and is anchored via the buckle strap 82 to the underbody 36 with the buckle strap 82 extending through the mating insertion slit 78 of the mating linear slit 75a, 75b of the facing material 74 and along the mating slit 68a, 68b of the cushion pad 67.

As shown in FIGS. 4-6, the cushion pad 67 of the seat cushion 43 has a bilaterally symmetric structure with respect to a longitudinal centerline (not shown) of the vehicle on which the seat assembly 11 is to be installed. The upwardly swelling part 72 of the cushion pad 67 includes a left section 84, a central section 85, and a right section 86 which correspond in position to the left seat section 46, the central seat section 45, and the right seat section 47, respectively, of the seat assembly 11 (FIG. 2). The cushion pad 67 has a body 87 on which an occupant or occupants are sitting, and the left, central and right sections 84, 85, 86 of the upwardly swelling part 72 are disposed in succession along a rear edge of the cushion pad body 87.

The right and left connector insertion holes 65R and 65L of one pair of the right and left connector insertion holes 65R, 65L are formed in the left section 84 of the upwardly swelling part 72 of the cushion pad 67 and located adjacent to right and left ends of the left section 84. Similarly, the right and left connector insertion holes 65R and 65L of the other pair of the right and left connector insertion holes 65R, 65L are formed in the right section 86 of the upwardly swelling part 72 of the cushion pad 67 and located adjacent to right and left ends of the right section 86. The connector insertion holes 65R, 65L of both pair of right and left connector insertion holes 65R, 65L have a generally square shape and are dimensioned to allow passage of the connectors 64R, 64L, respectively, of the child seat 63.

As shown in FIGS. 4-6, the slit 65L is formed in the right section 86 of the upwardly swelling part 72 of the cushion pad 67 diametrically across the connector insertion hole 65L, and the slit 65R is formed in the left section 84 of the upwardly swelling part 72 of the cushion pad 67 diametrically across the connector insertion hole 65R. The slits 68a, 68b each have an upper end 91 (FIG. 4) opening at both of a top face 72a of the upwardly swelling part 72 of the cushion pad 67 and a top face 87a of the cushion pad body 87, a bottom end 92 (FIG. 6) located below the level of the top face 87a of the cushion pad body 87, a first longitudinal end (rear end) 93 (FIG. 4) opening at a rear end face 67a of the cushion pad 67 including the upwardly swelling part 72, and a second longitudinal end (front end) 94 (FIG. 5) located forwardly of a front end face 72b of the upwardly swelling part 72 of the cushion pad 67. Each of the slits 68a, 68b has a longitudinal portion 95 (FIG. 5) which is formed in the cushion pad body 87 and disposed forwardly of the upwardly swelling portion 72 of the cushion pad 67 in which the connector insertion holes 65L, 65R is formed. The longitudinal portions of the slits 68a, 68b is configured to accommodate the buckles 61R, 61C, 61L when the connectors 64R, 64L are inserted from the connector insertion slits 77 of the facing material 74 into one pair of connector insertion holes 65R, 65L of the upwardly swelling part 72 in order to attach the child seat 63 to the seat assembly 11.

In assembly of the seat belt assembly 22 (FIG. 1) relative to the seat assembly 11, the buckle straps 82 (FIG. 2) of the buckles 61R, 61C, 61L are anchored to the under body 36 of the vehicle and, subsequently, the seat cushion 43 is placed on the under body 36 in such a manner as to cover the anchoring positions of the buckles 61R, 61C, 61L. The buckles 61R and 61C are pulled out onto the seat cushion 43 through the slit 68b with the respective buckle straps 82 extending along the slit 68b. Similarly, the buckle 61L is pulled out onto the seat cushion 43 through the slit 68a with the buckle strap 82 extending along the slit 68b.

The vehicular seat assembly 11 of the foregoing construction is able to achieve various advantageous effects, as enumerated below with reference to FIGS. 2-6.

(1) Cushion pad 67 can retain a desired mechanical strength.

The connector insertion holes 65R, 65L provided for attachment of a child seat 63 to the seat assembly 11 and the slits 68a, 68b provided for allowing the buckles 61R, 61C, 61L to be pulled out onto the seat cushion 43 are formed continuously or otherwise integrally with each other. This arrangement makes it possible to reduce a total area of hollow portions or openings of the cushion pad 67 including the connector insertion holes 65R, 65L and the slits 68a, 68b. With this reduced area of openings, the cushion pad 67 can retain a desired mechanical strength. More particularly, since each of the slits 68a, 68b is formed to extend diametrically across a corresponding one of the connector insertion holes 65L, 65R, a part of the slit 68a, 68b is formed by the corresponding connector insertion hole 65L, 65R and a corresponding area of the slit 68a, 68b can be reduced.

(2) Cushion pad 67 can provide a high level of comfort to vehicle occupants.

By virtue of the continuous or integral structure of the connector insertion holes 65L, 65R and the slits 68a, 68b, it is possible to centralize the hollow portions or openings in the cushion pad 67. With this centralized arrangement of the hollow portions, the cushion pad 67 can provide a high level of comfort to an occupant of the vehicular seat assembly 11.

(3) Cushion pad 67 is able to prevent interference between the buckle 61R, 61L and the connector 64R, 64L of the child seat 63 when the child seat 63 is to be attached to the seat assembly 11.

The slits 68a, 68b each have a longitudinal portion 95 formed in the cushion pad body 87 and disposed forwardly of the upwardly swelling portion 72 of the cushion pad 67 in which the connector insertion holes 65L, 65R are formed, so that the buckles 61R, 61C, 61L can be accommodated in the longitudinal portions 95 of the slits 68a, 68b when the connectors 64R, 64L are inserted from the connector insertion slits 77 of the facing material 74 into one pair of connector insertion holes 65R, 65L of the upwardly swelling part 72 in order to attach the child seat 63 to the seat assembly 11. The thus accommodated buckles 61R, 61C, 61L are held out of contact or interference with the connectors 64R, 64L of the child seat 63.

Obviously, various minor changes and modifications of the present invention are possible in light of the above teaching. It is therefore to be understood that within the scope of the appended claims the invention may be practiced otherwise than as specifically described.

What is claimed is:

1. A vehicular seat assembly configured for use with a seat belt assembly having a buckle anchored at a position below the seat assembly, and a child seat having a connector for attachment to the seat assembly, the seat assembly comprising:
a seat cushion including a cushion pad, the cushion pad supporting a vehicle occupant in a seated position and defining a connector insertion hole that receives the connector of the child seat, the cushion pad also defining a slit that receives the buckle and allows the buckle to be pulled from the position below the seat assembly through the cushion pad, wherein the slit is narrower than the insertion hole and extends from the connector insertion hole in a vehicular longitudinal direction so as to be continuous with the connector insertion hole.

2. The vehicular seat assembly according to claim 1, wherein the cushion pad has an upwardly swelling part formed at a rear end portion thereof, the connector insertion hole is formed in the upwardly swelling part, and the slit has a longitudinal portion formed in a body of the cushion pad and disposed forwardly of the upwardly swelling part of the cushion pad.

3. The vehicular seat assembly according to claim 1, wherein the seat cushion further includes a facing material covering the cushion pad, the facing material having a linear slit formed therein and extending in register with both of the connector insertion hole and the slit of the cushion pad.

4. The vehicular seat assembly according to claim 3, wherein the slit in the cushion pad is formed to extend diametrically across the connector insertion hole, and the linear slit of the facing material extends in superposed relation to the slit of the cushion pad.

\* \* \* \* \*